United States Patent
Burberry et al.

(10) Patent No.: US 7,130,013 B2
(45) Date of Patent: Oct. 31, 2006

(54) METHOD OF FORMING A DISPLAY

(75) Inventors: Mitchell S. Burberry, Webster, NY (US); Theodore K. Ricks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 236 days.

(21) Appl. No.: 10/851,440

(22) Filed: May 21, 2004

(65) Prior Publication Data
US 2005/0259214 A1 Nov. 24, 2005

(51) Int. Cl.
*G02F 1/13* (2006.01)
*G02F 1/133* (2006.01)
*G02F 1/1333* (2006.01)

(52) U.S. Cl. .......................... 349/187; 349/158; 349/2; 349/167; 349/199; 349/33; 345/44; 345/84; 359/242; 359/267; 359/276

(58) Field of Classification Search ................ 349/187, 349/158, 2, 33, 167; 359/242, 267, 276; 354/44, 84
See application file for complete search history.

(56) References Cited

U.S. PATENT DOCUMENTS

| 5,952,683 | A | * | 9/1999 | Sakata et al. ............... 257/186 |
| 6,166,796 | A | | 12/2000 | Stephenson |
| 6,394,870 | B1 | | 5/2002 | Petruchik et al. |
| 6,469,757 | B1 | | 10/2002 | Petruchik |
| 2003/0202136 | A1 | | 10/2003 | Stephenson et al. |
| 2004/0066363 | A1 | * | 4/2004 | Yamano et al. ............... 345/98 |
| 2005/0259211 | A1 | * | 11/2005 | Stephenson et al. ........ 349/167 |

\* cited by examiner

*Primary Examiner*—Huyen Ngo
(74) *Attorney, Agent, or Firm*—Kathleen Neuner Manne; Lynne M. Blank

(57) ABSTRACT

A method of forming a display including three conductive layers is described. The display is driven by contacting a third conductive layer and a second conductive layer, wherein the second conductive layer transmits current to the first conductive layer, and an electric field is generated between the first and third conductive layers.

6 Claims, 2 Drawing Sheets

METHOD OF FORMING A DISPLAY

FIELD OF THE INVENTION

The present invention relates to methods of forming electrical contacts in a display.

BACKGROUND OF THE INVENTION

Light modulating displays and methods of forming them are well known. Displays can include a substrate, a first conductive layer, a light modulating material, and a second conductive layer. To drive the display, electrical impulses are provided to the first conductive layer and the second conductive layer to form an electric field that acts on the light modulating layer. Various methods of making electrical contact with the first conductive layer are known.

U.S. 2003/0202136 to Stephenson et al. discloses a display in which a polymer dispersed material layer is removed to expose a first conductor, creating a gap in the polymer dispersed material layer. Conductive material is printed over the gap to contact the first conductor, creating a single column contact.

U.S. Pat. No. 6,394,870 to Petruchik et al. describes a method for forming a display. A transparent, electrically conductive coating is formed on a transparent substrate. A light modulating layer including liquid crystalline material in a polymer binder is formed over the electrically conductive layer, and an opaque conductive material is deposited in an imagewise pattern over the light modulating layer in the form of viewable and conductive images. Electrical connections enable an electrical field to be applied between selected ones of the viewable and conductive images and the transparent electrically conductive layer. Electrical connections from a printed circuit board to the first conductor are made through rounded or piercing pins that penetrate the light modulating layer. To facilitate electrical contact of the rounded pins to the first conductor, chemical etching of the light modulating layer is required. However, such etching is undesirable due to complexity and the amount of time required. The piercing pins can damage the conductive layer. Piercing pins are also disclosed in U.S. Pat. No. 6,166,796 to Stephenson.

In U.S. Pat. No. 6,469,757 to Petruchik, a process for selectively removing a light modulating layer containing a liquid crystalline material in a polymeric binder from the electrically conductive layer of a liquid crystal display web is disclosed. The process includes applying to a selected portion of the upper surface of the display web a solvent effective for softening the light modulating layer at a controlled rate of application. The solvent forms a selected, softened portion of the light modulating layer, which is removed from the electrically conductive layer of the substrate. This process can lead to physical damage of the electrically conductive layer, such as scratching, leading to failures in the performance of the display.

There exists a need therefore for providing electrical contact to a first conductor that is simple to implement and avoids damaging the conductive material.

SUMMARY OF THE INVENTION

The present invention is directed to processes for making and driving a display comprising three conductive layers. The display comprises a first conductive layer on a substrate, a second conductive layer on at least a portion of the first conductive layer, a light-modulating layer coated over at least the first conductive layer, and a third conductive layer formed on the light modulating layer, wherein the third conductive layer does not directly contact either the first conductive layer or the second conductive layer. The display is driven by forming an electric field between the first and third conductive layers by electrically contacting the second conductive layer and the third conductive layer, wherein the second conductive layer provides electrical contact to the first conductive layer.

ADVANTAGES

The methods of forming the flexible display materials described herein have several advantages over the existing art. By providing a second conductor between the first conductor and the light modulating layer, electrical contact to the first conductor can be made through the second conductor by a number of methods and techniques with substantially reduced risk of damage to the first conductor.

Figure 1:
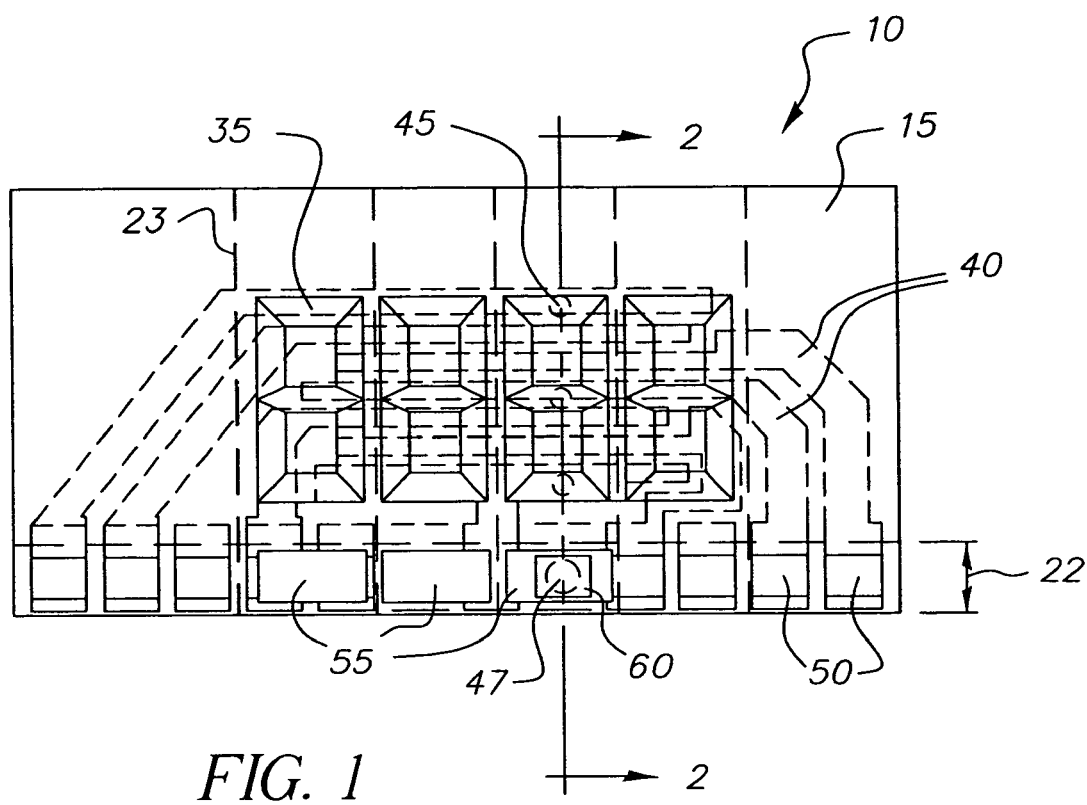
FIG. 1 is a front view of a character display.

The drawings are exemplary only, and depict various embodiments of the invention. Other embodiments will be apparent on review of the following description.

DETAILED DESCRIPTION OF THE INVENTION

Methods of forming electrical connections to a first conductive layer between a substrate and a light modulating layer of a display are presented, wherein the methods can reduce or eliminate the risk of damage to the first conductor, improve the electrical connection to the first conductive layer, and eliminate costly or difficult manufacturing steps. As described herein, the methods include making electrical contact to the first conductive layer through a second conductive layer adjacent the first conductive layer. Applying electrical impulses to the second conductive layer and a third conductive layer over the light modulating material can form electrical fields that act on the light modulating layer to form images.

A display can present changeable information. "Information" as used herein refers to an image, icon, or text character imparting news or product information, for example unit size, unit weight, product name, manufacturer name, trademark, UPC, bar code, or the like.

A display can include a substrate, two or more conductive layers, and a light modulating layer between the conductive layers. Various methods of forming a display are known to practitioners in the art, and are described, for example, in U.S. Ser. No. 10/134,185 by Stephenson et al.

The display substrate can be any suitable material, for example, metal foil, glass or plastic. When metal foil is used, an insulating layer can be present to electrically isolate the substrate from the active display structure. When the substrate is plastic, it can be flexible, for example, a flexible self-supporting plastic film. "Plastic" means a polymer, for example, a polymeric synthetic resin, which can optionally be combined with other ingredients, such as curatives, fillers, reinforcing agents, colorants, plasticizers, and the like. Plastic can include thermoplastic materials and thermosetting materials. When a flexible plastic substrate is used, it can be reinforced with a hard coating, for example, an acrylic coating. The coating can have a thickness of from 1 to 15 microns, for example, from 2 to 4 microns. Various hard coatings can be used, dependent upon the substrate material, and can include, for example, a mixture of UV-cured polyester acrylate and colloidal silica, known as "Lintec" by Lintec Corporation of Tokyo, Japan, or an acrylic coating sold as Terrapin® by Tekra Corporation, New Berlin, Wis.

The surface of the substrate opposite from the first conductive layer can be treated with ultraviolet light absorbers, scratch resistant coatings, anti-stat coatings, or other materials providing desirable properties. Two or more such materials can be coated on the substrate in one or more layers.

The first conductive layer can include one or more conductive material, for example, metal, metal oxide, or conductive polymer. Suitable metal oxides can include but are not limited to indium oxide, titanium dioxide, cadmium oxide, gallium indium oxide, niobium pentoxide, or tin dioxide. Additional metal oxides suitable for use in addition to those already mentioned include, for example, oxides of cerium, titanium, zirconium, hafnium and tantalum, as disclosed in U.S. Pat. No. 5,667,853 to Fukuyoshi et al. Transparent conductive oxides that can be used include, but are not limited to, $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. According to various embodiments, the first conductive layer can be tin-oxide, indium-tin-oxide (ITO), or polythiophene. The first conductive layer can be an opaque electrical conductor formed of metal such as copper, aluminum, or nickel. If the first conductive layer is an opaque metal, the metal can be a metal oxide to create a light absorbing conductive layer. The first conductive layer can be formed by any known method, including, for example, low temperature sputtering techniques or direct current sputtering techniques such as DC-sputtering or RF-DC sputtering, depending upon the material or materials of the underlying layer. The first conductive layer can also be coated or printed, for example, by ink jet deposition. The first conductive layer can be patterned, for example, into a plurality of electrodes, such as lines, columns, or segments.

A second conductive layer can be formed adjacent the first conductive layer by any means, for example, by thick film printing, stripe coating, evaporation, chemical vapor deposition, or sputtering. The second conductive material can be any known conductive material, for example, carbon, graphite, or metals such as silver, alone or in a binder. An exemplary material is Electrodag 423SS solvent-based screen printable electrical conductive material from Acheson Corporation in Midland, Mich. Ultraviolet-curable silver-based conductive inks such as UVAG10 from Allied PhotoChemical in Kimball, Mich., can also be used as the second conductive layer.

A third conductive layer can be any of the materials suitable for the second conductive layer. The third conductive layer can be formed by any means, such as those described for forming the second conductive layer. The third conductive layer can be patterned as lines, segments, or icons. When the third conductive layer is patterned into lines, the lines can be skewed relative to the first conductive layer. In the case of matrix displays, the third conductive layer can form a pattern perpendicular to a pattern of the first conductive layer. The first conductive layer and the third conductive layer can form electrodes of any configuration including, but not limited to, icon-containing displays, segmented displays, row—column passive matrix displays, active matrix displays, and sheet displays.

The light modulation layer between the first conductive layer and the third conductive layer can include light modulating materials such as, but not limited to, cholesteric liquid crystals, liquid crystals between polarizers, electrophoretic materials, electrochomic, Gyricon materials, or light emitting materials such as organic light emitting diode displays. Liquid crystals suitable for use can include cholesteric, nematic, ferroelectric, or smectic liquid crystals. Examples of suitable cholesteric liquid crystal materials include, but are not limited to, Merck BL112, BL118 or BL126, available from EM Industries of Hawthorne, N.Y. The application of electric fields of various intensity and duration can change the state of bistable materials from a reflective to a transmissive state. Bistable materials can maintain a given state indefinitely after the field is removed.

The light modulating layer can be associated with additional layers interposed between the first and third conductive layers. For purposes of this description, the associated layers, when present, are considered to be part of the light modulating layer and, as such, are treated as one layer called a light modulating layer.

One or more subbing layer can be deposited between the light modulating layer and the first conducive layer. The subbing layer can function to promote adhesion; to prevent shorting; to improve light transition, absorption, or reflection; or to provide any other desirable property between the first conductive layer and the light modulating layer. The subbing layer can be organic, for example, a polymer or gelatin, or inorganic, for example, aluminum oxide. The subbing layer can contain absorbing material such as a dye or pigment.

One or more backing layer can be deposited between the light modulating layer and the third conductive layer. The backing layer can function as described for a subbing layer. An exemplary backing layer for a cholesteric liquid crystal light modulating layer can be light absorbing, as disclosed in U.S. patent application Publication 2004/0032545 to Stephenson et al.

Additional layers can be formed above the second or third conductive layer to facilitate electrical contact thereto. For example, a dielectric layer can be formed. Standard printing or coating techniques can deposit a dielectric layer. The dielectric layer can be, for example, deionized gelatin or an electric ink, for example, Allied TGH1022 UV curable ink from Allied PhotoChemical in Kimball, Mich. The dielectric layer can be patterned with via holes that allow electrical contact to the underlying conductive layers.

Electrically conductive traces can be formed over the dielectric layer by printing or coating techniques. The material of the electrically conductive traces can be chosen from the same set of materials suitable for the second or third conductive layers.

Figure 2:
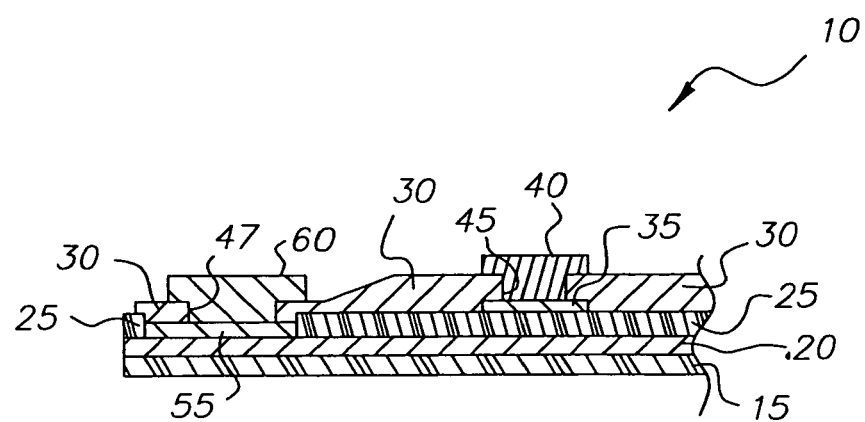
FIG. 2 is a cross-sectional view of a character display taken along line 2—2 in FIG. 1.

As shown in FIGS. 1 and 2, a display 10 can be constructed by forming a first conductive layer 20 on a substrate 15. The first conductive layer can be laser etched along lines 23 to electrically isolate the first conductive layer into common character conductors. Other methods of isolating common character conductors in first conductive layer 20 include pattern coating, sputter printing, other methods of select material application, laser etching, chemical etching, and other select material removal methods.

A layer of second conductive material 55 can be deposited over at least a portion of the first conductive layer 20.

Second conductive layer 55 can be selectively deposited on one or more common character conductors formed in first conductive layer 20.

A layer of light modulating material 25 can be deposited over at least a portion of the first conductive layer 20. The light modulating layer 25 can be deposited over at least a portion of the second conductive layer 55. The light modulating layer 25 can be formed on the first conductive layer 20 or second conductive layer 55 by roll coating, placement of a pre-formed layer, or any other means known to practitioners in the coating arts. The light modulating layer 25 can be applied simultaneously or in sequence to the first conductive layer 20 and second conductive layer 55. The same or different techniques can be used for application of the light modulating layer 25 to each of the first conductive layer 20 or second conductive layer 55.

If the light modulating layer is applied to the second conductive layer, the light modulating layer can be removed from at least a portion of the second conductive layer, leaving an exposed area of the second conductive layer. The light modulating layer can be removed by etching, laser ablation, skiving, or other known techniques. The light modulating layer can be removed, for example, by skiving with a nozzle tip, roller, or a combination thereof, as described in co-filed application Ser. No. 10/851,560 to Axtell et al., Ser. No. 10/851,913 to Rankin et al., and Ser. No. 10/851,492 to Weiner et al.

As shown in FIG. 2, the third conductive layer 35 can be deposited over the light modulating material layer 25 as conductive character segments. The conductive character segments can be arranged to form numbers (0–9), a slash, a decimal point, a dollar sign, a cent sign, or any other alpha-numeric character or symbol. The third conductive layer 35 can be formed by thick film printing, sputter coating, or other printing or coating means.

A dielectric layer 30 can be formed over the third conductive layer 35 and light modulating material 25 by standard printing or coating techniques. Via holes 45 can be formed through dielectric layer 30 over at least a portion of the third conductive layer 35. Over the second conductive layer 55, pad via holes 47 can be formed by the absence of dielectric layer 30 over at least a portion of second conductive layer 55. Pad via holes 47 in the dielectric layer 30 allow contact between the second conductive layer 55 and drive electronics. The dielectric layer 30 can be formed to provide via holes 45 and pad via holes 47, for example by printing, or coating with a mask. A portion of the dielectric layer 30 can be removed from third conductive layer 35 or second conductive layer 55 to provide via holes 45 and pad via holes 47 by known techniques, for example, ablation, chemical etching, or skiving.

Electrically conductive traces 40 can be formed over the dielectric layer 30 by printing or coating techniques. One or more electrically conductive trace 40 can flow through a via hole 45 on formation, making electrical contact with the third conductive layer 35. The conductive traces 40 can extend from third conductive layer 35 to the exposed area 22 along one or more side of the display 10. In exposed area 22, the conductive trace 40 can form a contact pad 50. The dielectric layer 30 can be patterned around and over the second conductive layer 55 in such a way that the contact pad 50 can be electrically isolated from second conductive layer 55 and first conductive layer 20.

One or more optional conductive pads 60 can be formed over dielectric layer 30 in exposed area 22 and can flow through the pad via hole 47 to form an electrical contact to the second conductive layer in exposed area 22. The conductive pad 60 can be formed from the same materials and printing processes as described for conductive trace 40. The contact pad 50 and conductive pad 60 can each independently be formed with the conductive trace 40, or separately therefrom.

The contact pad 50 and conductive pad 60 can be formed along one side of the display 10, along multiple sides of the display 10, or in one or more locations on the display not including a third conductive layer 35. The contact pads 50 and conductive pads 60 can each independently be placed linearly or grouped, such as in a pattern, for example, a square or rectangle.

The optical state of the light modulating layer 25 between the third conductive layer 35 and the first conductive layer 20 can be changed by selectively applying drive voltages to the corresponding contact pad 50 that is electrically connected to the third conductive layer 35 through a conductive trace 40, and to the first conductive layer 20 by contact to conductive pad 60 or second conductive layer 55. Once the optical state of the bistable material has been changed, it can remain in that state indefinitely without further power being applied.

Figure 3A:
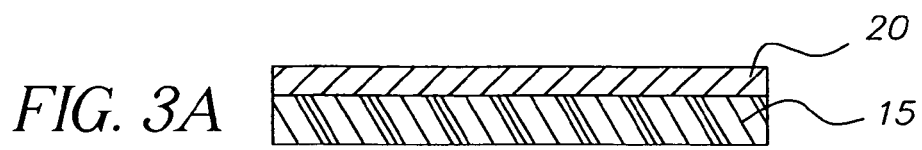
FIGS. 3A through 3F are cross-sectional views of a display prepared according to the process of the invention.
Figure 3B:
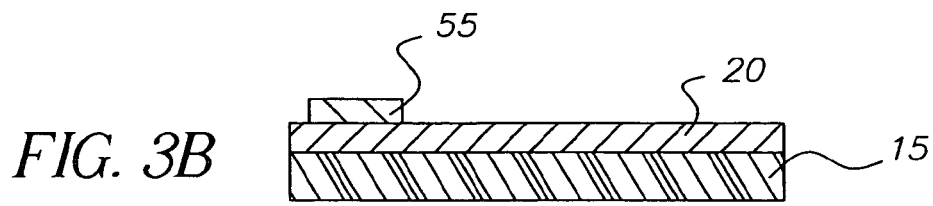
Figure 3C:
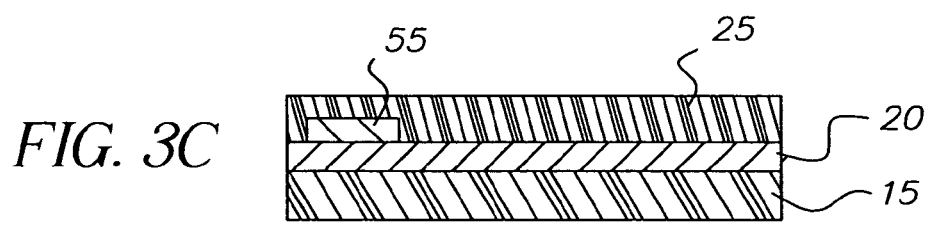

FIGS. 3A–3G illustrate an exemplary series of steps for forming a character display as described herein. Referring to FIG. 3A, the substrate 15 can be sputter coated with a first conductive layer 20, such as indium tin oxide. As shown in FIG. 3B, a second conductive layer 55 can be formed, for example, by screen-printing, on a selected portion of the first conductive layer 20. The first conductive layer 20 can be patterned before application of the second conductive layer 55, or both the first and second conductive layers can be patterned simultaneously. As shown in FIG. 3C, a light modulating layer 25 can be coated over at least a portion of the first conductive layer 20. The light modulating layer 25 can be coated over at least a portion of the second conductive layer 55.

Figure 3D:
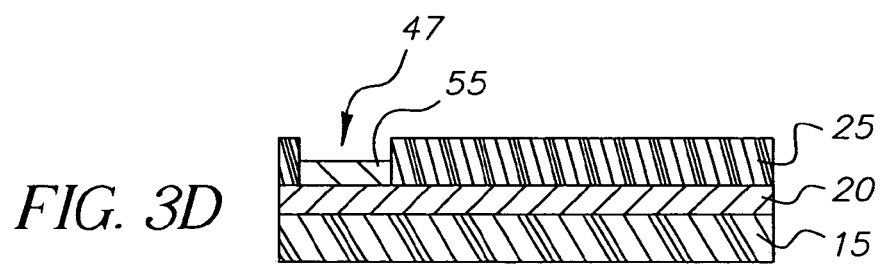
Figure 3E:
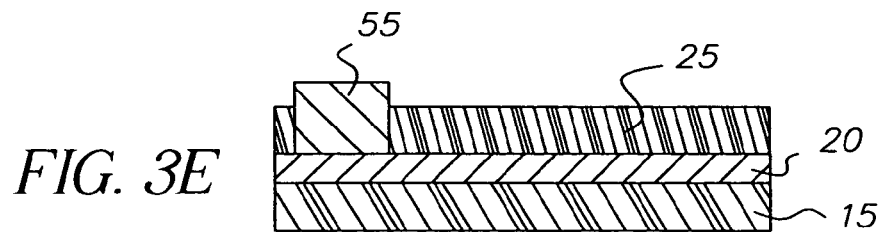
Figure 3F:
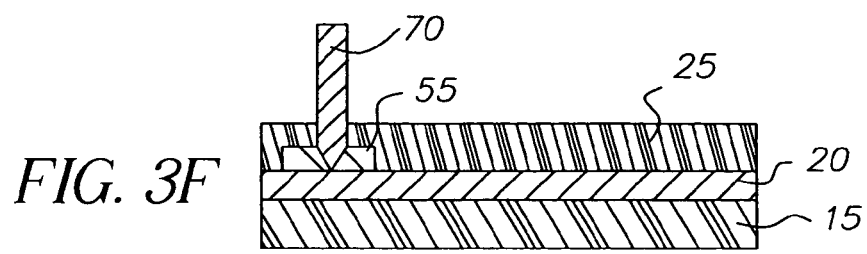

As shown in FIG. 3D, the light modulating layer 25 can be removed over at least a portion of the second conductive layer 55 to form pad via hole 47. Subsequent layers can be deposited over exposed second conductive layer 55 to direct current to the second conductive layer 55, as described above, or contact can be made directly to the second conductive layer 55. The light modulating layer 25 can be removed by active or passive techniques.

Active techniques can include any technique in which physical removal of the light modulating layer 25 is effected by an apparatus. For example, a knife blade, vacuum collection device, roller, squeegee, skive, like apparatus, or a combination thereof can be used. Use of the second conductive layer 55 allows more force to be used in removing the light modulating layer 25, without the possibility of damaging the first conductive layer 20. Damage to the first conductive layer 20 could render it non-conductive or poorly conductive. By controlling the thickness of the second conductive layer 55, the amount of the light modulating layer that must be removed can be minimized. For example, the second conductive layer 55 can be made much thicker than the light modulating layer 25 so that during or after coating the light modulating layer 25, at least some of the light modulating layer material flows off of or around the second conductive layer 55, as shown, for example, in FIG. 3F. The thickness of the second conductive layer 55 can be made the same or slightly less than the thickness of the light modulating layer 25, so a portion of the light modulating layer 25 can be removed, exposing the second conductive layer 55. A thin layer of the entire light modulating layer 25, or a portion of the light modulating layer 25 only over the second conductive layer 55, can be removed.

Passive removal techniques can include a technique to control the surface energy interaction between the second conductive layer 55 and the light modulating layer 25. For example, the light modulating layer 25 can be repelled from the surface of the second conductive layer 55 during coating. The surface of the second conductive layer 55 can be made hydrophobic so that an aqueous coated light modulating layer 25 will be repelled. Alternatively, the second conductive layer 55 can be hydrophilic to repel solvent-based light modulating layer 25 coatings. The second conductive layer 55 can include fluorinated moieties which can repel a certain light modulating layer 25, as known to practitioners in the art. Using passive techniques, the second conductive layer 55 can be the same thickness as light modulating layer 25, shorter than light modulating layer 25, or thicker than light modulating layer 25.

The light modulating layer 25 can be stripe-coated in register with the second conductive layer 55 to prevent the light modulating layer 25 from contacting a portion of the first conductive layer 20.

According to certain embodiments, the light modulating layer 25 can be allowed to cover the second conductive layer 55. Contact to the second conductive layer can be through the light modulating layer 25 using one or more pin 70, as illustrated in FIG. 3G. One or more pin can penetrate a portion of the second conductive layer 55, or can pass through the second conductive layer 55, directly contacting the first conductive layer 20. The pin 70 can form a hole through at least a portion of a display 10 or individually formed layers, or can be inserted through a pre-formed hole or opening. The second conductive layer 55 can function as a conformal contact pad to distribute current passed through the pin 70 evenly to the first conductive layer 20, even if the pin 70 damages a point of contact with the first conductive layer 20. The pin 70 at the point of contact with the second conductive layer 55 or the first conductive layer 20 can be pointed, curved, or flat-faced. According to certain embodiments, the pin 70 can be pointed. The pin 70 can be any conductive material, for example, a metal or metal oxide. The pin 70 can be conductive only where it contacts the second conductive layer or the first conductive layer. For example, the pin can have a conductive tip, or can be coated with a non-conductive material, for example, a polymer, ceramic, or oxide, except for the tip. The pin 70 can be any metal or alloy of metal such as copper, silver, gold, or aluminum. Other suitable piercing materials are available, for example, from Nanopierce Technologies, Inc. of Denver, Colo.

The display can be formed by patterning the first conductive layer on the substrate, for example, by laser ablation or screen printing. The second conductive layer can be printed in register with the pattern of the first conductive layer such that the second conductive layer does not make electrical contact between isolated portions of the first conductive layer. The light modulating layer can be coated over the first and second conductive layer and substrate, and a portion of the light modulating layer removed to expose at least a portion of the second conductive layer. Subsequent layers can be formed on the light modulating layer as described herein to complete the display.

The display can be made by forming the second conductive layer as a continuous layer or stripe over an unpatterned first conductive layer on a substrate. Before or after depositing the light modulating layer, the first and second conductive layers can be patterned, simultaneously, or in succession, into isolated areas. For example, the first and second conductive layers can be laser etched into isolated areas through a transparent substrate. If patterned in succession, the same or a different technique can be used to pattern the second conductive layer and the first conductive layer. The patterning can be done by laser ablation, chemical etching, skiving, or other removal techniques capable of forming thin, clean areas of removed material. After patterning and/or coating, subsequent layers can be formed on the light modulating layer as described herein to complete the display.

The invention has been described with reference to segmented liquid crystal displays by way of example. Any display can be made by the methods herein, for example, matrix displays with rows and columns of conductive electrodes, or active matrix displays. Any structure requiring multiple conductive layers, with contact to each, can be made as described herein.

EXAMPLE

An experiment was performed to demonstrate the advantages of making contact with a second conductive layer by piercing a liquid crystal layer in a display. Displays were formed as follows.

A flexible polyethylene terephthalate substrate in the form of a continuous web was printed with rows of small rectangular patches of transparent Indium Tin Oxide at 300 ohms per square to form a first conductive layer. Each patch was approximately 3 mm×2 mm with a 0.5 mm gap between patches, creating a gap dimension of 2 mm×0.5 mm. 14 patches were printed aligned in a row with the long axis of the web. The patches were screen-printed using a DEK printer and a 305 mesh screen by Sefar America.

Some of the ITO patches were coated with a second conductive layer of ultra-violet curable silver ink, UVAG10 from Allied PhotoChemical in Kimball, Mich. The ink curing was initiated with a Fusion H bulb unit.

An emulsion was provided with cholesteric liquid crystal oil domains Merck BL118 from E.M. Industries of Hawthorne, N.Y. U.S.A., having a mean diameter of 10 microns in an aqueous solution comprising 8% weight percent of a 5% Type IV gelatin. 0.1% of Olin 10 G (p-isononylphenoxypolyglycidol), a coating surfactant, was added to help with the coating process. The emulsion was heated to 40 degrees centigrade.

Some of the displays having only a first conductive layer, and those having a first and second conductive layer, were continuously coated with the heated emulsion at 6.17 mg/cm$^2$ using a syringe coating machine with a single slot X-hopper. The gap between the web and the X-hopper was 5 microns. As the emulsion exited the X-hopper, the web was held stationary and the X-hopper traversed the web on a chilling plate at 8 feet per second. The hopper speed was set so that the emulsion temperature was reduced to 10 degrees centigrade on the chilling plate. The web with the chill-set, hardened emulsion was removed from the syringe coating machine and dried under ambient conditions. The resulting light modulating layer was about 9 microns thick and covered the printed patches of first conductive layer, and where present, the second conductive layer.

Example 1

A Fluke 83 III multimeter with two sharp point probes approximately 0.5 mm apart was used to measure resistance of the first conductive layer or second conductive layer. The probes were gently contacted to the displays in multiple areas as follows. "Gentle contact" means enough force to penetrate the light modulating layer if present, but not enough to penetrate the conductive layers or web. The probes were contacted to 1) areas of bare first conductive layer; 2) areas of liquid crystal coated first conductive layer; and 3) areas of liquid crystal coated second conductive layer over a first conductive layer. Five measurements were taken in each area. The average results with the average standard deviation are reported in Table 1. Lower average resistivity indicates better electrical connection. A low standard deviation indicates robustness of the electrical connection, for example, lower variability or noise in the electrical signal.

Example 2

In a second experiment, the probes were again contacted to the display in the three positions described for Example 1, but enough pressure was applied to the probes for them to pierce through all layers into the web. Five measurements were taken in each area. The average results and average standard deviation are shown in Table 1.

TABLE 1

| POSITION/ PRESSURE | RESISTANCE ($\Omega$) | STANDARD DEVIATION ($\Omega$) | RESULT |
|---|---|---|---|
| Bare ITO | | | |
| Gentle (Ex. 1) | 1600 | 940 | Poor connection; noisy |
| High (Ex. 2) | infinite | — | No connection |
| Coated ITO | | | |
| Gentle (Ex. 1) | infinite | — | No connection |
| High (Ex. 2) | infinite | — | No connection |
| Coated Second Conductor | | | |
| Gentle (Ex. 1) | 166 | 19 | Good connection; low noise |
| High (Ex. 2) | 228 | 48 | Good connection; low noise |

The results demonstrate the advantage of having a second conductive layer over the first conductive layer. Using gentle contact, the bare ITO showed high resistance and noisy intermittent electrical connection. The coated ITO was damaged by contact through the light modulating layer, resulting in no current flow. The presence of the second conductive layer over the first conductive layer resulted in a low electrical resistance and consistent electrical connection.

When high-pressure contact was made, both the bare and coated ITO exhibited infinite resistance. Contact to the coated second conductive layer exhibited a resistance of 228±48 ohms for five readings, demonstrating improved electrical connection and robustness when the second conductive layer is present.

The invention has been described with reference to certain embodiments thereof. It will be understood that variations and modifications can be effected within the spirit and scope of the invention.

PARTS LIST 10 display
15 substrate
20 first conductive layer
22 exposed area
23 lines
25 light modulating layer
30 dielectric layer
35 third conductive layer
40 conductive traces
45 via hole to third conductive layer
47 pad via hole to second conductive layer
50 contact pad
55 second conductive layer
60 conductive pad
70 piercing pin

The invention claimed is:

1. A method of making a display comprising:
    providing a substrate;
    forming a first conductive layer on the substrate;
    forming a second conductive layer on at least a portion of the first conductive layer;
    coating a light modulating layer over the first conductive layer and the second conductive layer;
    removing at least a portion of the light modulating layer to expose at least a portion of the second conductive layer; and
    forming a third conductive layer over the light modulating layer, wherein the third conductive layer does not contact either the first conductive layer or the second conductive layer.

2. The method of claim 1, wherein removing the light modulating layer from at least a portion of the second conductive layer is performed after forming a third conductive layer over the light modulating layer.

3. The method of claim 1, wherein at least one of the first conductive layer or the third conductive layer is transparent.

4. The method of claim 1, wherein removing at least a portion of the light modulating layer comprises skiving the light modulating layer with a blade, solid tip, nozzle, roller, or a combination thereof.

5. The method of claim 1, wherein the first conductive layer, second conductive layer, third conductive layer, or a combination thereof is patterned.

6. A display formed by the method of claim 1.

* * * * *